Figures 1, 2:
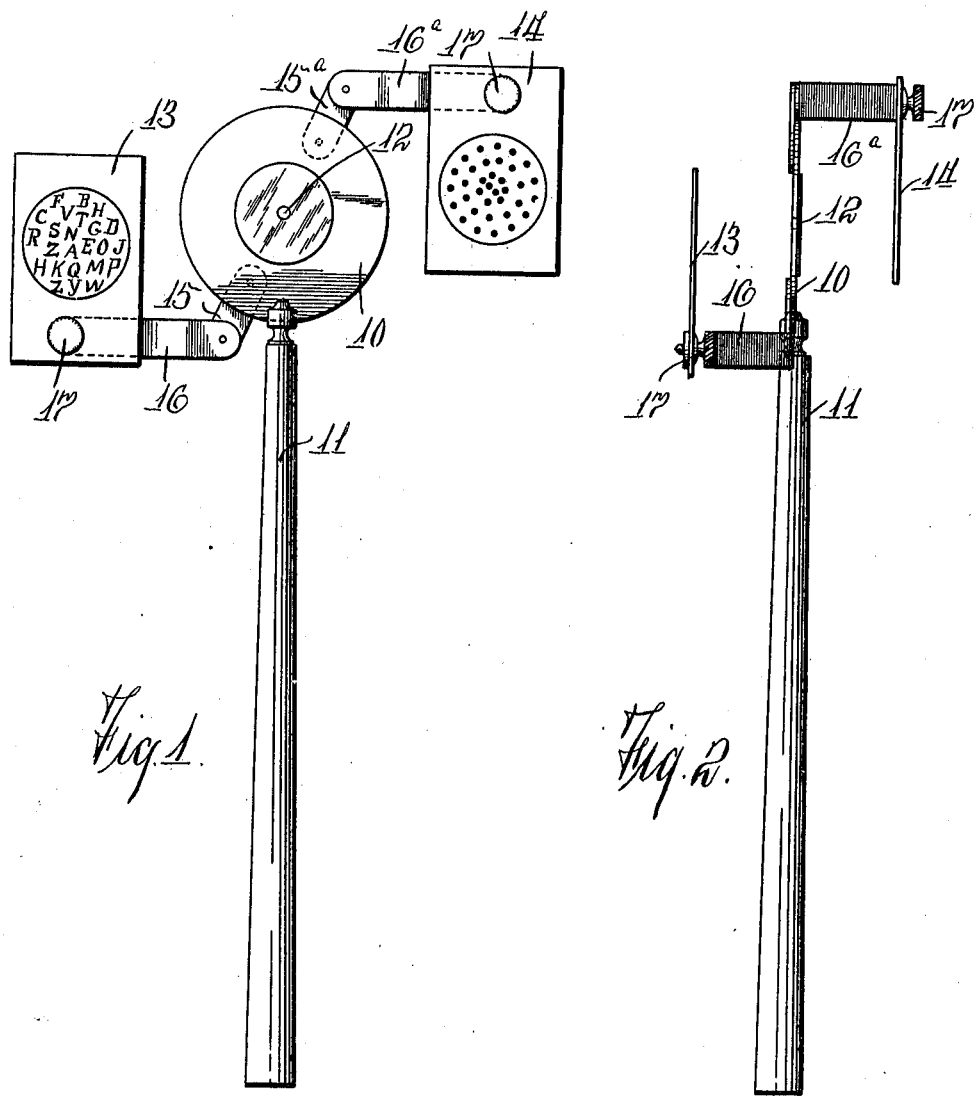

A. J. CROSS.
SKIASCOPE.
APPLICATION FILED APR. 29, 1909.

978,276.

Patented Dec. 13, 1910.

UNITED STATES PATENT OFFICE.

ANDREW JAY CROSS, OF NEW YORK, N. Y.

SKIASCOPE.

978,276.  Specification of Letters Patent.  Patented Dec. 13, 1910.

Application filed April 29, 1909. Serial No. 493,038.

*To all whom it may concern:*

Be it known that I, ANDREW JAY CROSS, of the city, county, and State of New York, have invented a new and useful Improvement in Skiascopes, of which the following is a full, clear, and exact description.

My invention relates to improvements in skiascope have been long in use, and with examining a patient's eye and in making focal adjustments and optometric calculations by the shadow test according to the method generally known as dynamic skiametry.

Ordinary plain examiners' mirrors or skiascopes have been long in use, and with these the examiner peeps through a central peep hole in the mirror so that he can examine the patient's eye critically, and this form of mirror is provided with a suitable handle. Under the old methods of eye examination it is customary to treat the eye with toxicants or drugs so that satisfactory examinations can be made, but with the more modern methods it is desirable to examine the eye while it is in normal condition and while the nerves are under focal tension. To this end it has been found desirable to provide fixation cards or targets having letters or dots or other matter to attract the attention of the patient, on which target the patient fixes his gaze and endeavors to count the dots or read the letters. Obviously the form of target and the matter thereon is immaterial, but by having these targets so that they can be placed either forward or back of a meridianal line, extending in any direction at right angles to the optic axis of the operator's eye, either anterior or posterior to its anterior pole, the operator is enabled to get the desired shadow test, and to critically observe the eye while it is at tension and normally focused on the target. For some purposes only one target is necessary, which is placed in a position so as to come slightly behind the front of the operator's eye, while in other cases the opposite arrangement is desirable, whereby the target can be placed a little forward of the operator's eye, but it is better to use a plurality of targets, having one arranged a little behind and below the skiascope or mirror, and the other a little in front and above the same. This can easily be done by providing brackets which are attached to the skiascope or mirror and extend in the desired direction therefrom.

Reference is to be had to the accompanying drawings forming a part of this specification, in which similar reference characters indicate corresponding parts in all the views.

Figure 1 is a front elevation of the skiascope embodying my invention, and Fig. 2 is a sectional elevation thereof.

The mirror or skiascope 10 is of the usual kind having a suitable handle 11, and a peep hole 12 extending through the central mirror. Targets 13 and 14 are arranged at the sides and a little behind and in front, respectively, of the skiascope or mirror, and these targets are preferably in the form of fixation cards, one having letters and the other dots thereon, and when the examiner applies the mirror to his eye and looks into the patient's eye, the target 13 will be a little behind the eye of the examiner or operator, while the target 14 will be a little in front thereof, and this forward projection has the advantage of being out of the way of the operator's nose. With the instrument applied as stated, the patient can be directed to look first at one target and then at the other, and read the letters aloud or similarly count the dots, and the operator can thus observe the eye in its different positions and readily get at his necessary calculations. Moreover, he can do this while the eye is in a perfectly normal state and under focal tension.

As a convenient means of supporting the fixation cards or targets 13 and 14, I use arms 15 and 15ª which radiate from the skiascope 10 and brackets 16 and 16ª which extend respectively laterally and rearwardly, and laterally and forwardly from the arms 15 and 15ª. The targets themselves are secured by thumb screws 17, but the particular manner in which the targets are held and the form of the brackets, is immaterial, the essential thing being to provide the targets, either singly or collectively at the sides and in the correct relation to the skiascope. I wish it distinctly understood that the form of target and the manner of suspension, is not important, though I claim the detail structure shown, but the essential thing is as stated to support the targets in proper relation to the mirror or skiascope.

Having thus fully described my invention, I claim as new and desire to secure by Letters Patent:—

1. A skiascope having targets supported at the sides thereof, one of said targets being in front of the plane of the skiascope body and one behind said plane and on the same plane as the nodal point of the examiner's eye.

2. A skiascope having brackets supported at the sides thereof, one of said brackets being adapted to support a target in front of the vertical plane of the skiascope, and the other of said brackets being adapted to support a target behind the vertical plane of said skiascope and on the same plane as the nodal point of the examiner's eye.

ANDREW JAY CROSS.

Witnesses:
 CHAS. L. COLES,
 FRANK F. GRAVES.